United States Patent Office 3,463,612
Patented Aug. 26, 1969

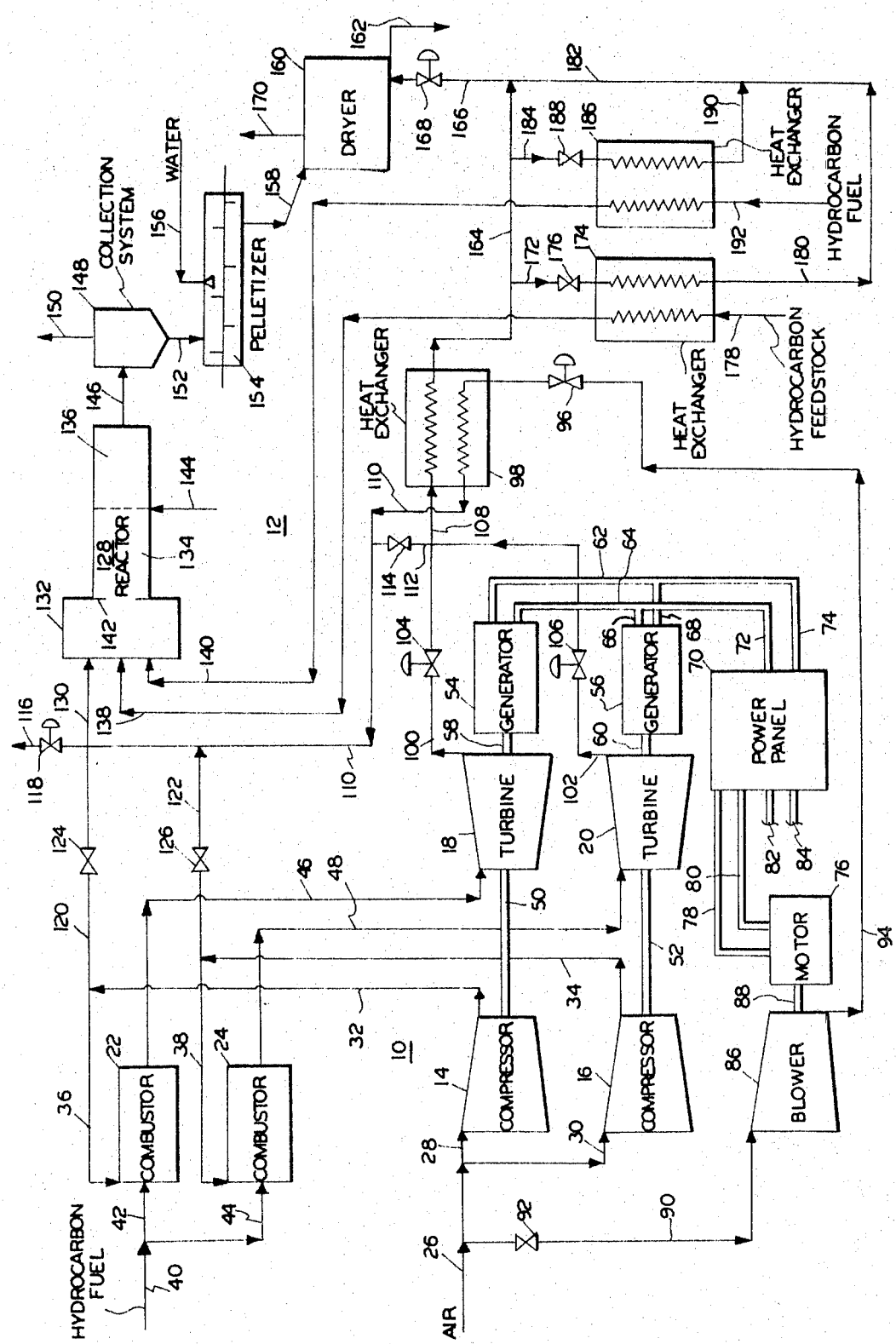

3,463,612
ADAPTION OF GAS TURBINE AND FREE PISTON ENGINES TO THE MANUFACTURE OF CARBON BLACK
Travis S. Whitsel, Jr., Houston, Tex., assignor to Ashland Oil & Refining Company, Houston, Tex., a corporation of Kentucky
Filed July 7, 1965, Ser. No. 470,102
Int. Cl. C09c 1/50, 1/58
U.S. Cl. 23—209.4                                14 Claims

ABSTRACT OF THE DISCLOSURE

A process and apparatus for the production of carbon black pellets by the pyrolysis of a hydrocarbon feedstock and wet pelleting of the carbon black which includes burning a hydrocarbon gas or oil with compressed air to produce hot flue gases, utilizing the hot flue gases to operate a gas turbine and thereby partially reduce the temperature of the hot flue gases, utilizing the turbine energy to compress air for the combustion chamber and to generate electricity which in turn operates a blower for compressing air for the carbon black furnace, utilizing a part of the hot flue gases from the turbine to heat the process air to the carbon black furnace, a hydrocarbon gas or oil to the carbon black furnace, an auxiliary hydrocarbon fuel to the furnace, and to dry wet pellets of carbon black recovered from the furnace effluent.

---

The present invention relates to a process and apparatus for the production of carbon black. In a more specific aspect the present invention relates to an improved process and apparatus for the production of carbon black by the cracking or pyrolysis of hydrocarbons. Still more specifically, the present invention relates to an improved process and apparatus for the production of carbon black which can be effectively and efficiently operated substantially independently of outside sources of energy.

In conventional processes for the manufacture of carbon black from a hydrocarbon feedstock, the energy necessary to rupture or crack the hydrocarbon feedstock is generally supplied by the combustion of a combustible material and/or part of the feedstock in the presence of a combustion-supporting gas. The hydrocarbon feedstock utilized in carbon black manufacture may be a normally gaseous hydrocarbon, a normally liquid hydrocarbon or mixtures thereof. The combustible material utilized to supply the heated atmosphere necessary to the reaction may be the same as, or different from, the feedstock, i.e., it may be a normally gaseous hydrocarbon, a normally liquid hydrocarbon or mixtures of the same. However, in the majority of cases, where liquid hydrocarbons are utilized as a feedstock for carbon black production, the hot atmosphere is produced by utilizing a hydrocarbon gas as the combustible material. The combustion-supporting gas is an oxygen-bearing gas, usually air. In a specific situation, therefore, the feedstock would be a liquid hydrocarbon, the combustible material would be natural gas, principally methane, and the combustion-supporting gas would be air. Under these conditions it is the general practice to supply the combustible gas and the combustion-supporting gas to a precombustion or heating section or chamber of a refractory-lined furnace, in such volumes as to produce combustion products or flue gases at temperatures of about 1500° F. or higher. The hot flue gas or products of combustion are commingled with the liquid hydrocarbon feedstock and introduced into a reaction section or chamber of the furnace where the hot gases provide the heat necessary to crack the hydrocarbon feedstock to elemental carbon. The liquid hydrocarbon feedstock is generally introduced axially into the furnace by spraying the liquid under pressure or atomizing the liquid with air or the hydrocarbon gas used as the combustible material. Since the oxygen in the combustible mixture is generally far in excess of that necessary for a stoichiometric reatcion with the combustible gas, a certain volume of the hydrocarbon feedstock is burned in the combustion section as well as the reaction section of the furnace. This partial burning of the hydrocarbon feedstock makes up in part for the energy needed for the cracking or pyrolysis reaction since this is an endothermic reaction. The resultant carbon black-bearing reaction gases, normally at temperatures of about 800° to 1000° F., are discharged to a carbon black collection system where the carbon black particles are separated from waste gases. The waste gases are then discharged through appropriate vents to the atmosphere. The carbon black particles, which are too fine to be conveniently handled, are fed to a pelleting apparatus where they are formed into agglomerates or pellets by mixing the carbon black particles with water and tumbling or otherwise forming the material into pellets. From the pelleting apparatus or pellet mill the wet pellets are then fed to a drier apparatus where the water is evaporated and the pellets are dried. The dry pellets are then sent to an appropriate storage or shipping facility. As previously indicated, the combustion-supporting gas to the carbon black reactor is generally preheated and is introduced at a high pressure. The introduction of combustion-supporting gas or air under pressure requires that the air be compressed in blowers or compressors to a pressure of about 6–7 p.s.i.g. Such blowers or compressors require substantial amounts of electrical energy for their operation. These power requirements make the conventional carbon black production techniques and apparatus incapable of use in remote locations where such electrical power is not available or where the available power is too erratic for effective and efficient operation. In addition, in the conventional carbon black production technique, heat is often supplied to the compressed, combustion-supporting gas by regenerative heat exchange with reaction product gases or the combustion products discharged from the reactor. These carbon-laden gases supply only a small amount of heat to the compressed air and the heat thus supplied is not readily controllable. In addition, the carbon-laden gases from the reactor are generally at extremely high temperatures and are corrosive in nature. Therefore, heating compressed air or process air in this manner requires that expensive stainless steel heat exchangers be employed. This not only increases the initial cost of the plant but fails to eliminate any significant portion of over-all maintenance costs of the heat exchangers. As indicated, the wet pellets of the process are generally dried after leaving the pellet mill. Heat for such drying is normally supplied by burning natural gas or other fuels in a separate furnace and contacting the pellets with the hot flue gases or combustion products of this furnace. This additional supply of hot gas results in the consumption of substantial additional amounts of fuel.

In light of the above, it is therefore highly desirable to be able to produce carbon black without substantial requirements of outside power and fuel. It is therefore an object of the present invention to provide such a process and apparatus. Still another object of the present invention is to provide an improved process and apparatus for the production of carbon black which requires minimum operating personnel. Another object of the present invention is to provide an improved process and apparatus for the production of carbon black which makes maxiumum use of automatic control. A further object of the present invention is to provide an improved process and apparatus for the production of carbon black which is a most desirable adjunct to a rubber plant. Another object of the present invention is to provide an improved process and apparatus for the production of carbon black which may be utilized in remote locations where normal utilities are not available. Another object of the present invention is to provide an improved process and apparatus for the production of carbon black in which cheap raw materials and utilities can be employed. Another object of the present invention is to provide an improved process and apparatus for the production of carbon black which is insensitive to outside influences. A yet further object of the present invention is to provide an improved process and apparatus for the production of carbon black which is independent and insensitive to outside power interruptions. Another object of the present invention is to provide an improved process and apparatus for the production of carbon black which is substantially independent of outside utilities. Another and further object of the present invention is to provide an improved process and apparatus for the production of carbon black which requires no outside source of electrical energy. A further object of the present invention is to provide an improved process and apparatus for the production of carbon black which substantially reduces the volume of fuel needed for the operation. Yet another object of the present invention is to provide an improved process and apparatus for the production of carbon black which requires only the carbon black producing feedstock, small quantities of a fuel and air. Still another object of the present invention is to provide an improved process and apparatus for the production of carbon black which will economically produce from 5 to 15 million pounds per year of carbon black substantially independently of outside power sources. A further object of the present invention is to provide an improved process and apparatus for the production of carbon black which is substantially independent and insensitive to the quality of the water available. Yet another object of the present invention is to provide an improved process and apparatus for the production of carbon black which requires minimal use of quench water. A still further object of the present invention is to provide an improved process and apparatus for the production of carbon black in which the reactor quench temperature can be kept constant. Yet another object of the present invention is to provide an improved process and apparatus for the production of carbon black in which the reaction quench temperature can be maintained sufficiently high to gain maximum advantage from radiation cooling. A further object of the present invention is to provide an improver process and apparatus for the production of carbon black which makes maximum use of the heat content of waste gases. Still another object of the present invention is to provide an improved process and apparatus for the production of carbon black which makes maximum use of regenerative heaters for process air. Another object of the present invention is to provide an improved process and apparatus for the production of carbon black in which the process air temperature can be accurately controlled. A further object of the present invention is to provide an improved process and apparatus for the production of carbon black in which heat exchangers can be operated at lower temperatures. Another and further object of the present invention is to provide an improved process and apparatus for the production of carbon black in which non-corrosive gases are utilized in all heat exchangers. A yet further object of the present invention is to provide an improved process and apparatus for the production of carbon black in which heat exchanger maintenance costs are lowered. A further object of the present invention is to provide an improved process and apparatus for the production of carbon black in which the necessity of costly stainless steel heat exchangers is eliminated. Another object of the present invention is to provide an improved process and apparatus for the production of carbon black which includes a simplifier collection unit and conveying equipment. A further object of the present invention is to provide an improved process and apparatus for the production of carbon black which makes efficient utilization of space and gravity flow of materials. Another and further object of the present invention is to provide an improved process and apparatus for the production of carbon black in which quality control is simplified, thereby eliminating the necessity of laboratory facilities. Another object of the present invention is to provide an improved process and apparatus for the production of carbon black which utilizes turbines for the generation of all power requirements of the plant. Still another object of the present invention is to provide an improved process and apparatus for the production of carbon black which eliminates the necessity of regenerative heat exchange with the product gases of the carbon black furnace. Yet another object of the present invention is to provide an improved process and apparatus for the production of carbon black wherein the necessity of outside electrical power is eliminated. A further object of the present invention is to provide an improved process and apparatus for the production of carbon black wherein a furnace for the production of hot gases for the drying of carbon black pellets is eliminated. A still further object of the present invention is to provide an improved process and apparatus for the production of carbon black which utilizes turbines to generate electrical power, heat combustion-supporting gas for the reactor and provide hot gases for drying carbon black pellets.

In accordance with the present invention it has been surprisingly discovered that an effective and efficient carbon black plant, which is substantially independent of outside sources of power can be provided by utilizing gas turbines to generate all of the power requirements of the plant. Specifically, at least one turbine is fed with a hydrocarbon fuel which is burned in the presence of excess oxygen to produce a turbine drive gas. The turbine power thus produced is utilized to generate electrical energy sufficient to compress all of the air necessary for the operation of carbon black reactor while the hot, effluent drive gases from the turbine supply heat to the combustion-supporting gases charged to the reactor and for drying wet pelleted carbon black. Among the numerous alternative operations the exhaust gases of the turbine may be utilized for the heating of the hydrocarbon feedstock to the reactor, the hydrocarbon fuel to the reactor or any other purposes for which heat is required in the plant. Further, the electrical energy generated by the turbines may also be utilized to provide all of the electrical requirements for the plant, such as lighting, instrument operation, etc. Finally, compressed air from the compressor of the turbine and hot effluent drive gases from the turbine can be employed to supply a part or all of the requirements of combustion-supporting gas for the carbon black reactor.

For a detailed description of the present invention reference is now made to the drawing which shows schematically a preferred combination of equipment adapted to carry out the present process.

Referring specifically to FIGURE 1, the apparatus includes a turbine system 10 and a carbon black production system 12. Turbine system 10 includes a pair of compressors 14 and 16, a complementary pair of combustors or combustion chambers 22 and 24, respectively. Air is supplied to the turbine system 10 through air manifold 26. From air manifold 26 air is introduced to compressor 14 through air line 28 and to compressor 16 through air line 30. The compressed air, generally compressed by a ratio of about 5.5 to 1.0, leaves compressor 14 through line 32 and compressor 16 through line 34. Compressed air from line 32 is charged to combustor or combustion chamber 22 through line 36. Air which has been compressed in compressor 16 and discharged through line 34 is fed to combustor 24 through line 38. The turbine system 10 is supplied with a hydrocarbon fuel through fuel manifold line 40. The hydrocarbon fuel fed to the system may be either a gaseous hydrocarbon fuel, such as natural gas, or a liquid hydrocarbon fuel, such as fuel oil. The particular turbine system of the present invention is designed to operate on either gas or fuel oil on an equivalent basis. The hydrocarbon fuel is fed to combustor 22 through fuel line 42 and to combustor 34 through fuel line 44. The air supplied to combustors 22 and 24 through lines 36 and 38 is substantially in excess of that necessary for the stoichiometric combustion of the fuel. For example, air will burn methane stoichiometrically in a ratio of about 9.6 volumes of air per 1.0 volume of methane. However, volumes of air from about 9.6 to as much as 25 volumes or more per volume of gas can be employed, usually from 12 to 25 volumes. Likewise, oil will normally require about 15 pounds of air per 1.0 pound of oil for a stoichiometric reaction but ratios of about 15 pounds to as much as 100 pounds of air per pound of oil will normally be used in the turbine system. In combustors 22 and 24 the hydrocarbon fuel is burned to produce flue gases or combustion products rich in oxygen. This flue gas normally is discharged from the combustors at a temperature between about 1200° and 1600° F., usually about 1450° F. From combustors 22 and 24 the flue gas is passed to turbines 18 and 20 through flue gas lines 46 and 48, respectively. The passage of the hot flue gases through turbines 18 and 20 operates the turbines and in doing so performs useful work. Specifically, the turbines 18 and 20 supply all of the power necessary to drive compressors 14 and 16 through shafts 50 and 52, respectively. In addition to driving compressors 14 and 16, turbines 18 and 20 are also capable of performing other useful work. As shown, turbines 18 and 20 also drive generators 54 and 56, through drive shafts 58 and 60. Generators 54 and 56 are capable of generating 60-cycle alternating current and supplying such current to a three-phase system. Current from generators 54 is discharged through electrical lines 62 and 64 and current from generator 56 is discharged through electrical lines 66 and 68. This current is then fed to a power panel 70 through lines 72 and 74. The power from power panel 70 may perform a wide variety of plant operations and it is capable of supplying all of the power necessary for the plant of the present invention to thus provide a unitary system independent of other sources of power. Specifically, a portion of the power from power panel 70 may be supplied to blower motor 76 through electrical lines 78 and 80. Power for miscellaneous plant equipment, such as lighting, the hereinafter-mentioned carbon black collection system, pellet mills, driers and the like, and all of the instrumentation for the plant will generally be supplied through electrical lines 82 and 84. Blower motor 76 operates blower 86 through drive shaft 88. Blower 86 provides compressed process air for carbon black production system 12, as will be pointed out hereinatfer. Air is supplied to blower 86 through line 90. Line 90 is provided with valve 92, whose purpose will be described hereinafter. Compressed air is discharged from blower 86 through line 94 which has mounted therein flow recorder-controller 96. Thus, as described to this point, compressed air for reactor system 12 is provided without the need for an outside power, since generators 54 and 56 develop sufficient power to operate blower 86. In the production of carbon black the combustion-supporting gas or air is generally supplied at an elevated temperature. This is accomplished, in accordance with the present invention, by passing compressed air from line 94 through heat exchanger 98. Heat exchanger 98 is supplied with heat from the effluent drive gases exhausted from turbines 18 and 20. These exhaust gases may vary in temperature anywhere from 600° F. to 1500° F., depending upon the character of the turbine system and the amount of work performed by the turbines 18 and 20. Preferably, the effluent drive gases are between 600° and 1150° F. It is quite obvious that the temperature of the exhaust gases from the turbines will be reduced because of the energy extracted from the hot gases in the performance of the work of compression and power generation. These exhaust gases are discharged from turbines 18 and 20 through exhaust lines 100 and 102, respectively. Mounted in line 100 is temperature recorder-controller 104, and mounted in line 102 is temperature recorder-controller 106. The exhaust gases are combined in line 108 and pass through heat exchanger 98 in indirect heat exchange with the compressed air passing through the heat exchanger. The heated, compressed air from heat exchanger 98 is discharged through line 110 which serves as a combustion-supporting gas manifold line. For reasons which will be pointed out later, gas from turbines 18 and 20 passing through lines 100 and 102 may be by-passed through line 112, thereby cutting out heat exchanger 98 partially or completely and passing the hot flue gas from turbines 18 and 20 directly to combustion-supporting gas manifold 110. By-pass line 112 is controlled by valve 114. Manifold line 110 is provided with a vent line 116 and mounted in vent line 116 is pressure recorder-controller 118. Also, for reasons which will be pointed out later, all or a part of the compressed air from compressors 14 and 16 and passing through line 32 and 34 may be by-passed through by-pass compressed air lines 120 and 122, which connect to combustion-supporting gas manifold 110. By-pass lines 120 and 122 are provided with control valves 124 and 126, respectively. Hot compressed air from manifold line 110 is supplied to reactor 128 through combustion-supporting gas line 130. Reactor 128 is generally comprised of a combustion section or chamber 132, a reaction section or chamber 134, and a quench section or chamber 136. In combustion section 132 the reactant materials or feedstocks, introduced through line 138, are heated by the hot gas charged to the reaction through line 130 and the burning of a supplementary hydrocarbon fuel charged to reactor 128 through line 140. Normally, the amount of oxygen supplied in the gas charged through line 130 is in excess of that required to burn the fuel charged through line 140. Accordingly, a portion of the feedstock may also be burned in combustion section 132. The feedstock charged to reactor 128 may be any appropriate hydrocarbon material including hydrocarbon gases, such as natural gas, or hydrocarbon oils, such as heavy aromatic oils, or heavy coal tar residual oils. Generally, the hydrocarbon feedstock is a hydrocarbon oil. This oil is sprayed into the combustion section under pressure or is atomized in air or a gas, such as natural gas, and axially distributed in combustion section 132. The axially sprayed or atomized oil comes into intimate contact with the combustion-supporting gas and the fuel gas which are both introduced under pressure, usually as a screen of gas surrounding the oil atomizer. Combustion section 132 is separated from reaction section 134 by a restriction or orifice plate 142. Orifice 142 creates additional mixing and turbulence in the fuel gas, the combustion-supporting gas and the feedstock, thus resulting in intimate mixing and heating of the feedstock prior to its passage into reaction section 134. Since the reaction by which carbon black is produced is an endothermic reaction, the combustion of the fuel and/or feedstock in the presence of the excess oxygen in the combustion-supporting gas supplies the additional energy to maintain the reaction temperature substantially constant throughout the reaction. While reaction section 134 is shown divided from quench section 136 by a dashed line, this is in essence an imaginary division since these sections are usually a continuous tunnel or tube. The dividing line usually is defined by an axially introduced quench fluid charged through line 144. This quench fluid controls the reaction and in essence stops the reaction at a predetermined point. In most cases the quench fluid is water. A most satisfactory reactor of the character described is shown and described in detail in U.S. Patent 3,060,003. This particular reactor has been found quite effective and efficient in carrying out the present technique. The reaction products are discharged from quench section 136 through line 146. These reaction products comprise flue gases containing suspended carbon black product and are generally at a temperature in the neighborhood of about 800° to 1000° F. Carbon black is separated from gaseous by-products in a conventional collection system 148. Separated by-product or off gas is discharged from collection system 148 through exhaust line 150. The separated carbon black particles are discharged from collection system 148 through carbon black line 152. Line 152 feeds the particles of carbon black to a conventional pelleting apparatus 154. In pelleting apparatus 154 the carbon black particles are formed into pellets with the aid of water introduced through line 156. Such pelleting is generally accomplished by wetting and tumbling the carbon black in a suitable pellet mill. Wet carbon black pellets are discharged from pellet mill 154 through line 158. Line 158 also passes the wet pellets to a conventional pellet drier 160. In pellet drier 160 the pellets are heated to remove moisture and produce a dry pellet product. The dry pellets are discharged to storage or shipping facilities through line 162. Heat for drier 160 is supplied by the exhaust gases discharged from turbines 18 and 20 through lines 100 and 102. Preferably, these exhaust gases pass to header 108 and thence through heat exchanger 98, where they heat the process air, as previously described, before their utilization in drier 160. Accordingly, after passing through heat exchanger 98 the still hot turbine flue gas passes through lines 164 and then through line 166 to drier 160. An appropriate pressure recorder-controller 168 is mounted in line 166. After supplying heat to drier 160 and vaporizing the water from the pellets passing through drier 160, the waste gas or off gas laden with water vapor is discharged from drier 160 through vent 170. If desired, the turbine flue gases can also be employed for various other heating purposes either before, after, or simultaneously with their use to heat the process air and to dry the pellets. For example, as shown in the drawing, a part of the flue gas passing through line 164 may be diverted through line 172 to heat exchanger 174. The amount of flue gas thus diverted is conveniently controlled by valve 176 in line 172. Heat exchanger 174 preheats the hydrocarbon feedstock charged to reactor 128 through feedstock supply line 138. Therefore, the hydrocarbon feedstock is introduced through line 178 to heat exchanger 174 where the feedstock is heated by indirect heat exchanger with turbine flue gas and then passes to supply line 138. After passing through heat exchanger 174 the turbine flue gas is discharged through line 180 to flue gas line 182 which connects with line 166 feeding drier 160. In like manner, where it is desired to preheat the hydrocarbon fuel charged to reactor 128 through line 140, a portion of the turbine flue gas passing through line 164 may be diverted through line 184 to heat exchanger 186. The amount of flue gas thus diverted is controlled by valve means 188 in line 184. After passing through heat exchanger 186 the flue gas is discharged through line 190 where it joins the gas from heat exchanger 174 and passes through line 182. The hydrocarbon fuel is charged to the system through line 192 where it enters heat exchanger 186, is warmed by indirect heat exchange with the turbine flue gas and then passes to the reactor supply line 140. The hydrocarbon fuel may be any convenient fuel material capable of supplying heat for the endothermic reaction taking place in reactor 128. Accordingly, the hydrocarbon fuel may be the same as the feedstock or it may be a lighter liquid hydrocarbon or a hydrocarbon gas, such as natural gas. Preferably, the fuel is natural gas. Irrespective of the nature of the hydrocarbon fuel fed to the system through line 192, it should be recognized that it is preferable to utilize the same fuel to feed the system through line 40 to the combustors of the turbine system 10, and line 192 to the reactor system 12. Thus, while lines 40 and 192 are indicated as separate sources of hydrocarbon fuel, these are conveniently a single source of supply.

While the drawings illustrate turbine system 10 as a series of separate combustors, compressors and turbines, for convenience of illustration, in actual systems of this character the turbine system comprising the combustor, the compressor and the turbine are an integral unit mounted within a single compact casing. In fact, as previously mentioned, in the preferred unit of the present invention the generator is also an integral part of the power package. A specific example of a suitable turbine system is a unit known as "GTP-810" manufactured by the Garrett Corporation. Two such units are utilized in the preferred combination of the present invention.

It should also be recognized that while the turbine systems are shown in the drawing in the form of what is known as a "single shaft" turbine, it is not necessary that such a single shaft device be utilized. As a matter of fact, for certain variations of operations it is often desirable to utilize what is known as a "dual shaft" or "regenerative" turbine system. In the dual shaft system two separate turbines on separate shafts are employed. A first of these turbines is supplied with flue gas from the combustor and is coupled to the compressor of the system. This turbine drives only the compressor. Flue gases from the first compressor then pass to a second turbine, preferably after being reheated to the initial turbine inlet temperature of about 1450° F., where they drive the second turbine which in turn drives only the load, in this case the generator. The exhaust or flue gases from the second turbine then pass through a regenerative heat exchanger where they preheat the compressed air from the compressor, by indirect heat exchange, prior to the passage of the compressed air to the first turbine. The dual shaft or regenerative turbine system has a number of advantages over a single shaft system, depending upon operating requirements. Mainly, however, the exhaust gases from the system are of a lower temperature, thus permitting their use where the exhaust from conventional turbines could not be used and in some cases permitting the utilization of less expensive heat exchange equipment. In addition, by numerous adjustments of the ratio of air to fuel charged to the turbine system, the exhaust gas temperature may be controlled and maintained anywhere within a range from as low as 600° F., to the normal exhaust temperature of a conventional turbine. Another and preferred means for lowering and controlling the turbine exhaust temperature within the range just mentioned is by the use of what is known as a by-pass turbine. In the by-pass turbine a preselected volume of compressed air from the compressor is passed through a chamber surrounding the combuster to thereby by-pass the combustor. This not only permits one to attain a great deal of control over the temperature in the turbine, as well as the temperature of the turbine exhaust, but permits adjustment of the oxygen content of the turbine exhaust. This is also a distinct advantage in certain variations of the process.

As suggested in the previous description, there are certain modifications or alternate operations which can be performed in accordance with the present invention. For example, all or part of the air to the system may be diverted from the line 90 to blower 86 by partially or completely closing a valve 92. This would either eliminate or reduce the size of the blower 86, thus in turn requiring a smaller generator to operate the same. Adequate air for reactor 128 can still be provided by two other alternate routes. Specifically, a portion of the compressed air from compressors 14 and 16, which is discharged through lines 32 and 34, may be diverted to the reactor 128 through lines 120 and 122. While this air will normally have insufficient heat content to supply the necessary heat to the reactor, it can supply a substantial portion of the oxygen necessary to the reaction. A second source of combustion-supporting gas for reactor 128 is the flue gas from turbines 18 and 20. Since the turbines are normally operated with substantial volumes of excess air, the flue gases discharged from turbines 18 and 20 through lines 100 and 102 are not only hot, and thus capable of supplying the heat for reactor 128, but they also contain excess oxygen to burn the hydrocarbon fuel in the reactor. Accordingly, these turbine exhaust gases can be fed to reactor 128 as a source of combustion-supporting gas or simply as a hot inert gas by diverting a portion of the flue gases through line 112 to combustion-supporting gas header 110. The amount of turbine flue gas diverted in this manner can, of course, be controlled by valve 114. If heat exchangers 174 and 186 are used to preheat hydrocarbon fuel and hydrocarbon feedstock, it is quite obvious that most of the necessary heat for reactor 128 could be supplied by this means and all of the combustion-supporting gas could be taken from compressors 14 and 16. Various other combinations and modifications can be practiced without departing from the spirit of the present invention.

A specific example of a plant adapted to produce from 5 to 15 million pounds of high quality carbon black annually will be described. In this plant, two of the previously described Garrett Corporation turbines with integral alternators or generators are each supplied with about 10,000 standard cubic feet per hour of natural gas. Since these units are designed to operate on natural gas or liquid fuel, the turbine systems could be supplied with fuel oil of equivalent B.t.u. value. The turbine inlet temtemperatures or the temperature of the flue gas from the combustors would be in the neighborhood of about 1610° F. These two turbines, when thus operated, each produce from about 151 to 390 H.P. at 60 cycles and 480 volts over a four-wire, three-phase system. The power output will depend upon the air inlet temperature, which is ambient temperature, and the turbine flue gas discharge pressure, which may vary in a typical situation from 0 p.s.i.g. to 7 p.s.i.g. In the specific example, this outlet pressure should be about 2 p.s.i.g. At this outlet pressure the power output of each turbine would be 330 H.P. at 60° F., and 277 H.P. at 90° F. Thus, the combined power output of the two generators would average about 600 H.P. The turbine exhaust or effluent drive gas temperature will also vary in accordance with the discharge pressure. This variation, in the equipment specified, may be from 980° to 1130° F. At a discharge pressure of about 2 p.s.i.g., the exhaust temperature would be about 1100° F. The volume of exhaust gas produced will, of course, depend upon the ambient temperature and thus may vary from about 203,500 standard cubic feet per hour to 218,000 standard cubic feet per hour. For the two turbines the turbine flue gas volume would be about 400,000 standard cubic feet per hour. Of this volume from about 151,000 to 165,500 standard cubic feet per hour would be air while the remainder would be inert flue gas. As shown in the drawing, the flue gas from these two turbines passes to a heat exchanger 98 which heats process air from the reactor 128. After having heated the process air, the flue gases pass to the dried 160 where they are utilized to dry the pellets of carbon black. Accordingly, 400,000 standard cubic feet per hour of flue gas will be supplied and, after heat exchange with the process air at a temperature of 600° F., the flue gases will provide approximately 2,090,000 B.t.u.'s of heat to the drier at a drier stack temperature of 325° F. Comparing this with prior techniques, which utilize flue gases generated by burning natural gas in a separate furnace, a saving of about 3880 standard cubic feet per hour of natural gas is obtained for the system of this invention. The process air to the system is passed to blower 86 through line 90. Blower 86 is operated by the power supplied by generators 54 and 56. In the specific system illustrated, this blower is capable of supplying about 480,000 standard cubic feet per hour of air at a temperature of about 150° F., and a pressure of about 6 to 7 p.s.i.g. To perform this compression, the blower 86 would require about 250 H.P. of energy. Thus, about 350 H.P. of usable electrical energy still remains. About 240 H.P. of this is necessary for the operation of other plant equipment, such as the pellet mill and the like, thus leaving about 100 H.P. for miscellaneous uses, such as lighting, instrument operation, etc. The compressed air from blower 86 is fed through heat exchanger 98 through line 94. In heat exchanger 98, the indirect heat exchange with the turbine exhaust gases will raise the temperature of the process air to about 600° F. Approximately 380,000 standard cubic feet per hour of heated process air are then charged to the reactor 128 through lines 110 and 130. Any remainder of process air can be used for other purposes where compressed air is needed.

From the above, it is quite obvious that, by operation in accordance with the present invention, a complete, unitary, packaged carbon black plant can be provided for use in many locations not now suitable for the construction of a carbon black plant. Specifically, the plant can be utilized in remote locations where gas or fuel oil are available but electrical power is not available or is too erratic for efficient operation of conventional carbon black facilities.

While specific examples have been given and specific devices have been illustrated, it is to be recognized that these examples and illustrations are for purposes of clarity of description only. Further, numerous alternatives and modifications have also been suggested. However, numerous other alternatives and modifications will obviously occur to one skilled in the art without departing from the present invention. Accordingly, the invention is to be limited only in accordance with the appended claims.

I claim:

1. A process for the production of carbon black pellets by the pyrolysis of a hydrocarbon feedstock and subsequent wet pelleting of such pyrolytically-produced carbon black; comprising, burning a fuel to produce a hot flue gas; passing said hot flue gas through a turbine to develop turbine energy and an effluent gas having a temperature between about 600° and 1500° F.; compressing a free-oxygen-containing, combustion-supporting gas with at least a portion of said turbine energy; passing at least a portion of said compressed free oxygen-containing gas and a portion of said effluent flue gas from said turbine to a carbon black furnace; intimately mixing said compressed free oxygen-containing gas and said effluent flue gas from said turbine with a hydrocarbon feedstock in said carbon black furnace under conditions sufficient to produce carbon black particles by pyrolysis of said hydrocarbon feedstock; forming said carbon black particles into wet pellets; and passing a second portion of said effluent flue gas from said turbine through said wet pellets to dry the same.

2. A process in accordance with claim 1 wherein the free-oxygen-containing, combustion-supporting gas is heated by indirect heat exchange with the second portion of the effluent flue gas from the turbine after said free oxygen-containing, combustion-supporting gas is compressed.

3. A process in accordance with claim 2 wherein the hydrocarbon feedstock is heated by indirect heat exchange with at least a part of the second portion of the effluent flue gas from the turbine after said second portion of said effluent flue gas from said turbine has been heat-exchanged with the free oxygen-containing, combustion-supporting gas.

4. A process in accordance with claim 2 wherein a supplemental hydrocarbon fuel is also intimately mixed with the compressed free oxygen-containing gas, the effluent flue gas from the turbine and the hydrocarbon feedstock in the carbon black furnace; and said supplemental hydrocarbon fuel is heated by indirect heat exchange with at least a part of the second portion of the effluent flue gas from the turbine after said second portion of said effluent flue gas from said turbine has been utilized in heat-exchange with the free oxygen-containing, combustion-supporting gas.

5. The process in accordance with claim 3 wherein the turbine energy is converted to electrical energy and said electrical energy is utilized to operate a compressor for compressing the free oxygen-containing, combustion-supporting gas.

6. A process in accordance with claim 2 wherein a second portion of the turbine energy is utilized to compress a second free oxygen-containing gas; and a portion of said compressed, second free oxygen-containing, combustion-supporting gas is used to burn the fuel for producing the hot flue gas and the remainder is mixed with the first compressed free oxygen-containing gas and passed to the carbon black reactor.

7. A process in accordance with claim 2 wherein the hydrocarbon feedstock is a normally liquid hydrocarbon material.

8. A process in accordance with claim 2 wherein the fuel is a normally liquid hydrocarbon material.

9. A process in accordance with claim 1 wherein the hydrocarbon feedstock is heated by indirect heat exchange with at least a part of the second portion of the effluent flue gas from the turbine before said second portion of said effluent flue gas from said turbine has been utilized to dry the wet pellets.

10. A process in accordance with claim 1 wherein a supplemental hydrocarbon fuel is also intimately mixed with compressed free oxygen-containing gas, the effluent flue gas from the turbine and the hydrocarbon feedstock in the carbon black furnace; and said supplemental hydrocarbon fuel is heated by indirect heat exchange with at least a part of the second portion of the effluent flue gas from the turbine before said second portion of said effluent flue gas from said turbine has been utilized to dry the wet pellets.

11. The process in accordance with claim 1 wherein the turbine energy is converted to electrical energy and said electrical energy is utilized to operate a compressor for compressing the free oxygen-containing, combustion-supporting gas.

12. A process in accordance with claim 1 wherein a second portion of the turbine energy is utilized to compress a second free oxygen-containing gas; and a portion of said compressed, second free oxygen-containing, combustion-supporting gas is used to burn the fuel for producing the hot flue gas and the remainder is mixed with the first compressed free oxygen-containing gas and passed to the carbon black reactor.

13. A process in accordance with claim 1 wherein the hydrocarbon feedstock is a normally liquid hydrocarbon material.

14. A process in accordance with claim 1 wherein the fuel is a normally liquid hydrocarbon material.

References Cited

UNITED STATES PATENTS

| | | | |
|---|---|---|---|
| 2,718,755 | 9/1955 | Heller | 60—39.02 X |
| 2,805,268 | 9/1957 | Cunningham | 260—679 |
| 2,967,762 | 1/1961 | Krejci | 23—209.6 |
| 2,973,249 | 2/1961 | Haas | 23—209.6 |
| 3,320,154 | 5/1967 | Tokuhisa et al. | 23—262 X |
| 3,329,605 | 7/1967 | Tokuhisa et al. | 23—262 X |
| 3,095,699 | 7/1963 | Bauer | 60—39.02 |
| 3,289,409 | 12/1966 | Schirmer | 60—205 |

FOREIGN PATENTS 821,573  10/1959  Great Britain.

EDWARD J. MEROS, Primary Examiner

U.S. Cl. X.R.

23—209.6, 259.5